Feb. 11, 1930.        C. W. BERGER        1,746,815
COMBINATION TOOTHBRUSH STERILIZER, TOOTHBRUSH
AND TOOTHPASTE TUBE HOLDER
Filed Jan. 17, 1928
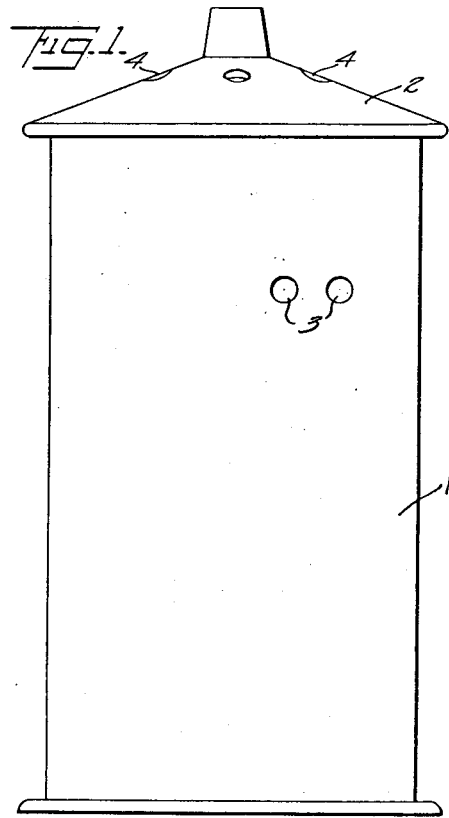
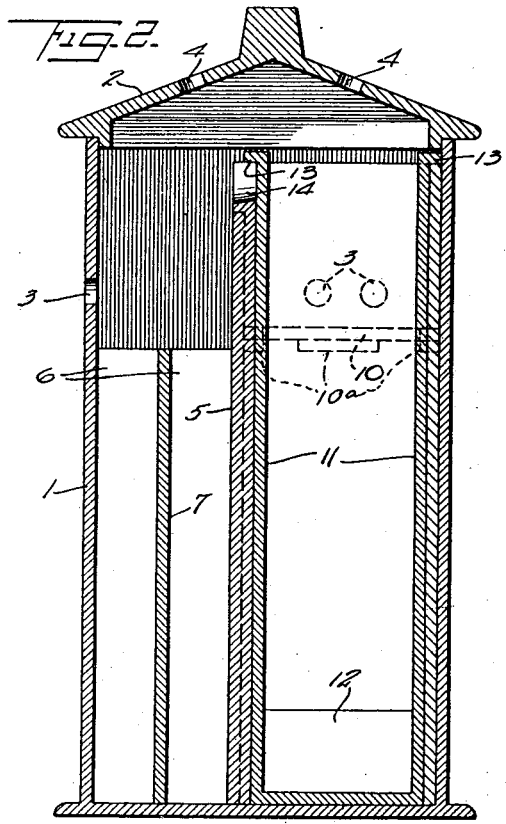
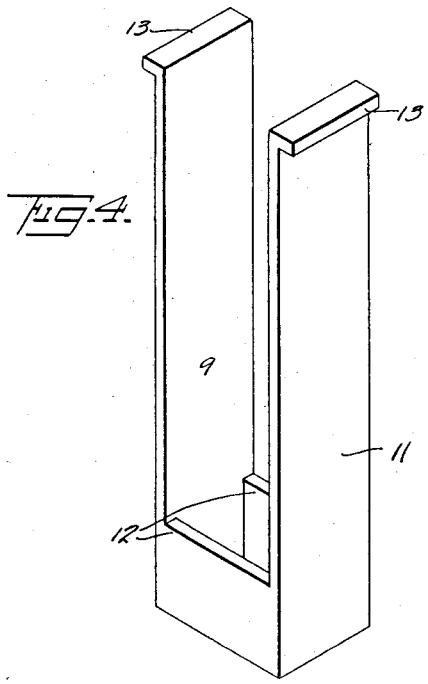
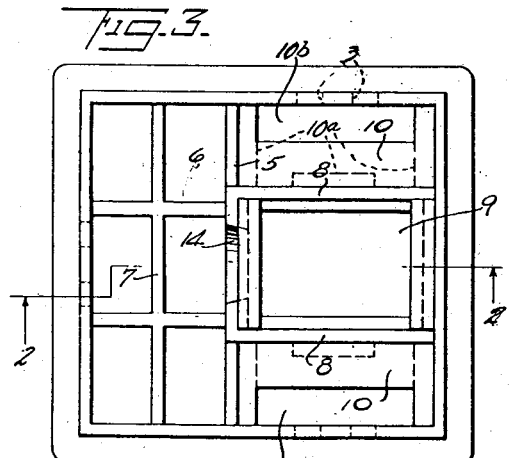
INVENTOR
CHARLES W. BERGER
BY
ATTORNEY Patented Feb. 11, 1930

1,746,815

UNITED STATES PATENT OFFICE

CHARLES WALTER BERGER, OF WOODCLIFF, NEW JERSEY

COMBINATION TOOTHBRUSH STERILIZER, TOOTHBRUSH, AND TOOTH-PASTE-TUBE HOLDER

Application filed January 17, 1928. Serial No. 247,426.

This invention comprises a receptacle especially adapted to hold toothbrushes, together with sundry bodies of sterilizing liquid and a convenient receptacle for a tube of tooth paste. Preferably the walls and cover of the receptacle have openings for ventilation. The best form of apparatus embodying my invention at present known to me is illustrated in the accompanying sheet of drawings in which Fig. 1 is a side elevation of a cabinet or receptacle of the character described above.

Fig. 2 is a vertical section taken on line 2—2 of Fig. 3.

Fig. 3 is a plan view of the receptacle with the cover removed, and

Fig. 4 a perspective detail on a larger scale of the preferred form of carrier for tooth paste.

1 represents the main body of the cabinet or receptacle, which is a casing open at the top and provided with various interior partitions. 2 is a removable cover therefor. The casing preferably has a series of openings 3, 3, in its walls for ventilation and the cover has similar openings 4, 4, for a like purpose.

As best shown in Fig. 3 a vertical partition 5 extends all the way across the interior of the casing 1, forming, together with partitions 6 and 7, a series of cellular spaces in which may be placed any desired non-poisonous, sterilizing fluid, not shown. 8, 8, are two cross partitions extending from the partition wall 5 to the opposite interior wall of casing 1 forming, with the partition 5 and said casing wall, a pocket of rectangular cross section in which may be inserted the tooth paste carrier generally represented at 9 and best shown in Fig. 4. As there shown, this carrier 9 consists of skeleton drawer having full length walls 11, 11, on opposite sides and cutaway walls 12, 12, on the other side, adjacent its closed end. The upper end of the drawer is open and the sides 11 have outwardly extending flanges 13, although this feature may be dispensed with. The carrier 9 fits snugly in the space between partitions 8, 8, and 5, and the latter is preferably cut away in semicircular form, as shown at 14, to permit the user to conveniently grasp one of the flanges 13 on the upper end of one of the walls 11 of the carrier 9 for the purpose of raising or removing same.

10, 10, represent partly cutaway shelves adapted to fit into the spaces between the partitions 8, 8, and the opposite, parallel walls of the receptacle 1, as shown in Fig. 3. These shelves are cut away at one side, as shown at $10^b$, and may rest on projections $10^a$, $10^a$, formed on the inner walls of the compartments in which they are placed, so that they may be easily removed and replaced.

The structure above described may be formed in whole or in part of milk or white enamel glass, hard rubber or other waterproof composition easily moldable. As shown, the cabinet is designed to take care of the tooth brushes of a maximum group of six persons. In use a sufficient quantity of the disinfecting fluid may be poured into each of the compartments formed by partition walls 6 and 7 to receive the brush end of each tooth brush and thoroughly impregnate the same. Each person using the cabinet would have a special compartment for his or her use. After the tooth brush has been thus sterilized, it is dropped into one of the compartments containing shelves 10, with the brush end uppermost, the bristles of the brush remaining above the shelf. In this position the brush will be dried by the currents of air entering through holes 3 and escaping through holes 4 in the cover, or traveling in the opposite direction. When any person desires to use his toothbrush again the cover 2 is removed. that person's brush is withdrawn from the casing, the carrier 9 lifted far enough out of the casing to permit the operator to conveniently grasp and remove the tube of tooth paste which has been lodged therein, and the brush and tooth paste used in the usual way. Thereafter the tube of tooth paste is dropped back into carrier 9, the tooth brush cleansed in the usual way and then inserted in the proper sterilizing pocket, as before described, and deposited on one of the racks 10, after which the cover 2 is replaced.

By removing the racks or shelves 10, and the skeleton drawer 9 at any time, all parts can be thoroughly cleansed and thereafter reassembled for further use.

Having described my invention, I claim:

1. A cabinet adapted to hold toothbrushes and the like articles comprising, in combination, an outer casing open at the top and a removable cover therefor, said casing enclosing a plurality of open receptacles adapted to contain sterilizing fluid, in each of which receptacles a tooth brush may be dipped, and a compartment having means for suspending said brushes for drying also located in said cabinet, together with a carrier removably mounted in said casing and adapted to hold a package of tooth paste.

2. A combination such as defined in claim 1 in which the walls of said casing and cover are perforated to permit air to circulate through the same.

3. An open top cabinet having a plurality of vertically arranged compartments therein also open at the top, combined with a removable skeleton carrier for a tube of tooth paste or the like article which carrier is adapted to nest in one of said compartments, said carrier comprising a box-like structure open at one end and having two of its opposite sidewalls cut away from its open end part way toward its closed end.

4. A cabinet adapted to hold toothbrushes and the like articles comprising, in combination, an outer casing open at the top and a removable cover therefor, said casing including a plurality of open receptacles adapted to contain sterilizing fluid, in each of which receptacles a toothbrush may be dipped, and a plurality of compartments each having a removable shelf therein for suspending said brushes for drying, together with a skeleton drawer adapted to hold a package of tooth paste mounted between two of said drying compartments.

5. In a toothbrush holding cabinet having an outer casing and a cover therefor permitting access to the casing interior, the combination, with said above recited elements, of an open receptacle adapted in said casing to contain a sterilizing fluid, in which a brush may be dipped, said receptacle being provided with ventilating openings to the outer air, and a compartment separated in said casing from said receptacle by a partition impervious to vapor extending to the upper end of said casing adapted to hold a toothbrush in erect position with its bristles uppermost, said compartment also being provided with ventilating openings to the outer air: whereby the brush bristles may be dried in fresh air and any vapors from the sterilizing fluid will be dissipated in the exterior air instead of being transmitted to said brush holding compartment.

CHARLES WALTER BERGER.